United States Patent Office
2,775,856
Patented Jan. 1, 1957

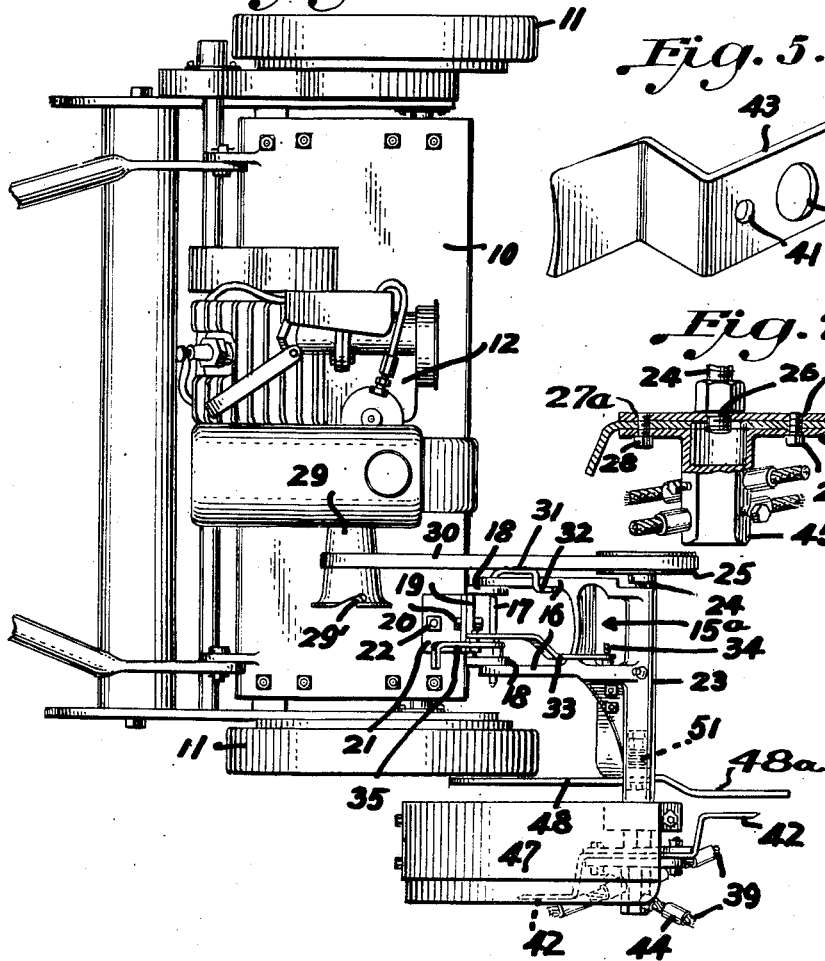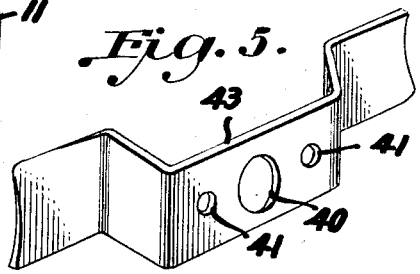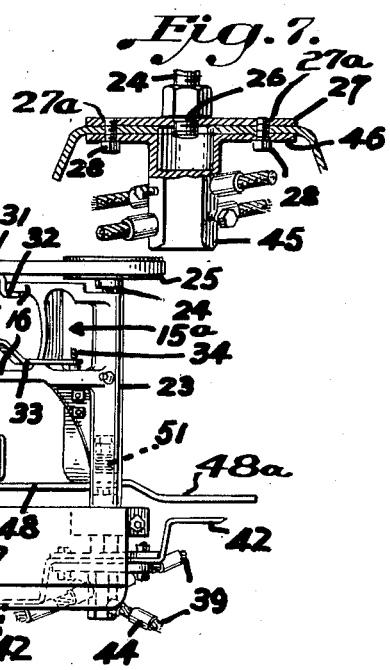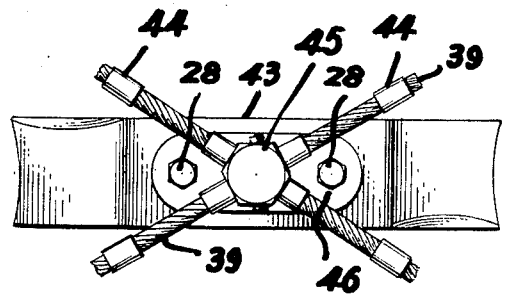

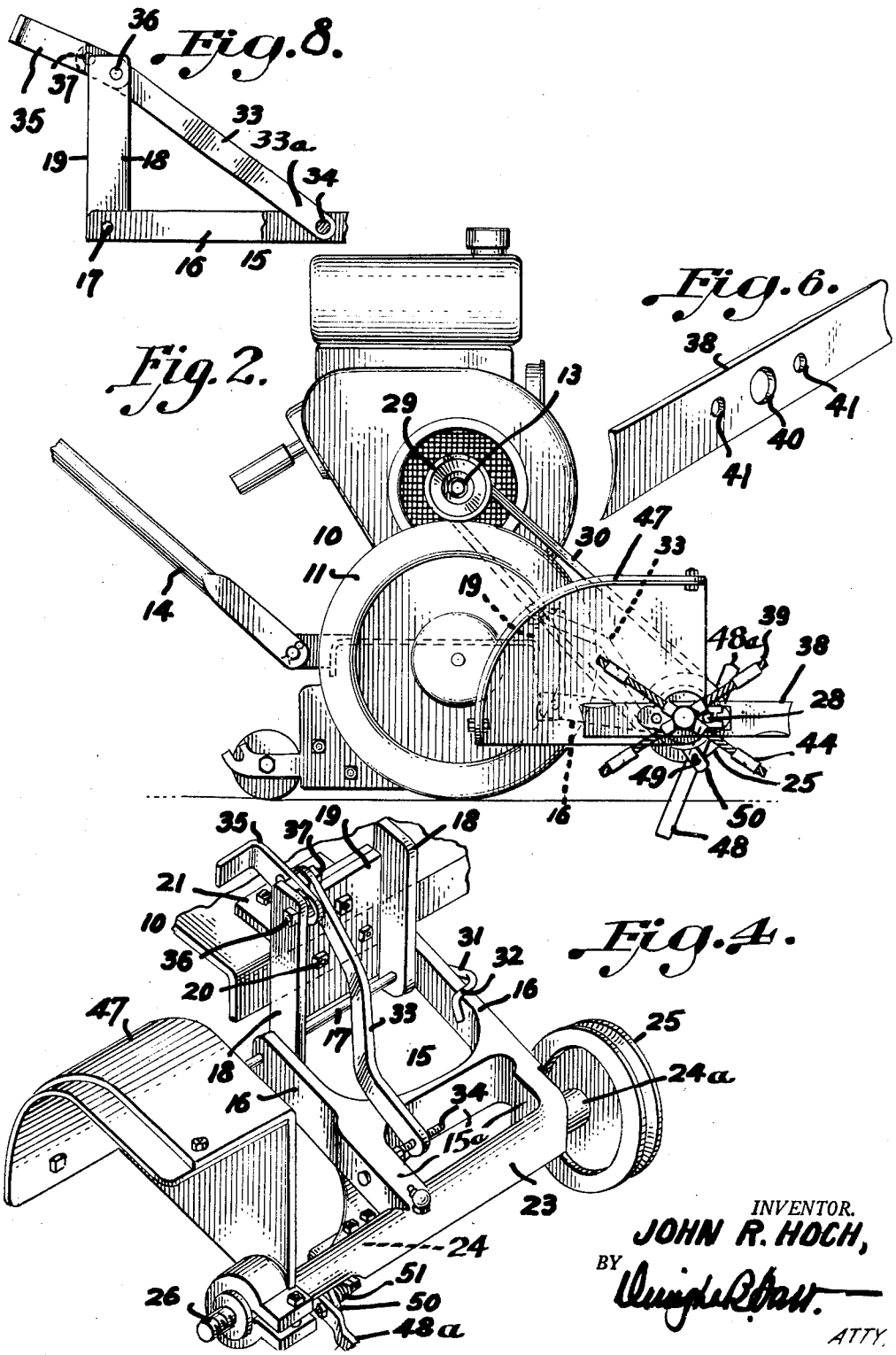

2,775,856
LAWN MOWER ATTACHMENT WITH ROTARY DISC CUTTER
John R. Hoch, Miami, Fla.
Application November 16, 1953, Serial No. 392,091
1 Claim. (Cl. 56—25.4)

This invention is a mower attachment adapted particularly for use in connection with power driven lawn mowers to provide means whereby the mower may be utilized to perform edging, trenching, cultivating or root clearing operations.

The primary object of the invention is to provide an attachment of extremely simple construction which may be easily and quickly applied to standard power driven lawn mowers for performing the operations generally referred to above, and which derives its power in accomplishing these functions from the power source of the lawn mower.

A further object of the invention is to provide a lawn mower attachment capable of being easily and quickly applied to or removed from standard lawn mowers now in use without the exercise of special tools or skill and which is applied to the lawn mower in such manner as not to interefere with the starting of the power engine nor to in any way interfere with the mowing functions of the machine.

A further object of the invention is to provide an attachment capable of using various accessory cutting or ground agitating devices, capable of being interchanged or used in conjunction with one another, which permits of the ready application to or removal of such accessories from the power shaft, and which may, without disturbing or removing any of such accessories, be rendered inoperative when the use of such accessories is not required.

A further and particular object of the invention is to provide an attachment of the character generally stated by means of which it is possible not only to edge the lawn with a blade, but also to trim the grass or remove excess vegetation from a sidewalk edge or to cultivate the space between the edge and fences, shrubbery or other objects.

A further object of the invention is to provide a lawn mower attachment of the character generally stated, featured by means whereby the attachment may be idled when its use is not required and which in the idling position is automatically disengaged from the power source.

A further and particular object of the invention is to provide an attachment capable of performing the various functions heretofore referred to, as well as others which will appear as the description proceeds, which is of extremely simple construction, which involves the use of comparatively few simple and readily assembled parts, which has its parts so constructed and combined in operative relationship as to minimize the possibility of wear, breakage or derangement, which is positive in its operations, which may be provided as an accessory or applied to the mower as standard equipment, and the simplicity of which is such as to enable the attachment to be constructed at a minimum of cost and equally as economically maintained.

With the foregoing objects in view, together with others which will appear as the description proceeds, the invention consists in the novel construction, combination and arrangement of parts, all as will be described more fully hereinafter, illustrated in the drawing, and particularly pointed out in the claim.

In the drawings:

Fig. 1 is a top plan view of a conventional form of power lawn mower and showing my attachment as applied thereto, Fig. 2 is an end elevation of the device as shown in Fig. 1, the view showing the parts in the position they will assume when the edger is in operation, Fig. 3 is an enlarged detail view showing the manner in which a cutter and rake may be assembled in combined relationship and used conjointly with the attachment, Fig. 4 is an enlarged detail fragmentary perspective view of the attachment in the position it will assume when in inoperative position, Fig. 5 is a detail perspective view, on a slightly enlarged scale, of one of the cutter devices used with the attachment, Fig. 6 is a similar view of a further cutting implement capable of being used with the attachment, Fig. 7 is an enlarged fragmentary sectional view showing the manner in which the cutter devices are attached to the power shaft, and Fig. 8 is an enlarged detail side elevation showing the manner in which the accessory frame is automatically locked in inoperative position.

Referring now more particularly to the drawings, and with reference more specifically to Figs. 1 and 2 thereof, 10 indicates generally the body or frame of a conventional form of power driven lawn mower; the same being provided with supporting drive wheels 11, as usual, at each side thereof and with a motor 12, in this instance gasoline operated, as will be understood. The engine shaft for motor starting purposes is indicated at 13. The mower is equipped with the usual operating handle represented at 14, and it will be understood that the mowing blades will be properly housed beneath or within the frame 10 and will be driven either from the motor or from the ground engaging wheels 11. The attachment of my invention comprises a supporting frame in the form of a yoke represented generally at 15. This yoke includes a pair of spaced parallel arms 16 having openings in their rear ends to receive a pivot pin 17 which passes through the spaced legs 18 of a supporting bracket 19 of channel formation secured by bolts, screws or other fastening devices 20 to a plate 21 secured by means of a bolt or bolts 22 to the upper face of the frame 10 of the mowing machine. This plate 21 is secured in this instance near the right hand end of the mowing machine frame.

The yoke 15 includes at its forward end 15a an elongated shaft bearing indicated at 23, within which is mounted a shaft 24 having rigidly attached to one end thereof a drive pulley 25. This pulley 25, it will be noted, is secured to the inner end 24a of the shaft 24. When the yoke 15 is properly applied to the channel bracket 19, the bearing 23 and shaft 24 will be disposed in spaced parallelism with the engine shaft 13, and the bearing and the shaft accommodated thereby are of such length as to project beyond and forwardly of the adjacent power wheel 11 of the mowing machine.

The outer end of the shaft 24 is threaded as shown at 26 (Fig. 7), to threadedly receive a base plate 27, the said plate having openings 27a therein spaced equidistant from the center of the plate for the reception of screws 28 to secure the various cutting or cultivating attachments to be hereafter more fully described. The pulley 25 of the yoke is aligned with a groove cone head 29 affixed to the engine shaft and substituted for the usual starter device. This head is equipped at its larger end with an angular recess 29' for the application thereto of a starter rope to be operated in the usual well known manner to initially turn over and start the motor.

The groove of the cone head 29 receives one end of an endless driving belt 30, the opposite end of which is trained around the pulley 25 of the attachment power shaft. It is obvious from this construction, therefore, that the usual starting rope may be readily applied to the cone head in a well known manner to give to the engine shaft its initial momentum in the starting operation, after which power from the rotating engine shaft may be transmitted to the attachment shaft 24 through the belt 30 passing around the cone head 29 and the pulley 25.

With reference particularly to Figs. 1 and 4 of the drawings, it will be observed that the pivot pin 17 which connects the yoke arms 16 with the arms 18 of the channel bracket has its inner end bent at substantially right angles in a forward direction to provide an arm 31, the forward extremity of which is again bent to provide a latch 32 to engage with the adjacent yoke arm 16. By this construction it is apparent that the pivot pin 17 may be easily and quickly withdrawn to disconnect the yoke from the bracket, and yet when in proper assembled position and latched with the yoke arm 16 the pivot pin is maintained in proper position for swingingly supporting the yoke and the attachments carried thereby.

The yoke 15 is mounted so as to be capable of assuming two positions, one inoperative and the other operative. When in the operative position, the frame will be in lowered positioned so that the edging, cultivating or raking attachments may operate upon the ground to bring about a desired result, but when the yoke is moved to inoperative or raised position, the cultivating, digging or raking instrumentalities will be cleared of the ground, the frame will be locked in inoperative position and at the same time the power connection between the engine shaft and the attachment shaft 24 will be broken. To this end, an elongated link 33 is pivotally and detachably connected at its forward end 33a to a horizontally extending pin 34 which is mounted on the forward end 15a of the yoke, the said link extending rearwardly and upwardly from the pin 34 to an operating lever 35 pivoted as at 36 to one of the bracket arms 18 of the channel bracket 19. The pivotal connection between the rear end of link 33 with the lever 35 is beyond the pivotal connection 36 of the arm with the bracket member 18, and is indicated at 37. The pivots 34, 36 and 37 are so located with respect to one another that when the lever 35 is moved to its limit in a rearward direction, the yoke 15 will be lifted to inoperative position and the pivot 37 will have passed beyond alignment of the pivots so as to lock the yoke thus elevated and in inoperative position. The relative location of the pivots for accomplishing this action is disclosed more particularly in Fig. 8 of the drawings. When the yoke is thus in raised position, the distance between the pulley 25 and the cone head 29 will have been diminished or decreased to such extent that the drive belt 30 will be loosened so that the power connection between the engine shaft 13 and the attachment shaft 24 will be broken. When the lever 35 is moved to forward or operative position, however, the link 33 will be moved forward permitting the yoke to pivot downwardly on the pin 17 to lower the attachments carried by the shaft 24 to assume operative position and at the same time the drive belt 30 will be tightened so as to reestablish the drive connection.

As heretofore stated, any desired number of different cutting or ground treating or agitating implements may be attached to the shaft 24. In Fig. 2 of the drawing a combination straight cutter blade 38 is combined with a rake member whose arms are indicated at 39 to bring about a cutting and cultivating or raking action. This specific cutter blade is illustrated in perspective in Fig. 6 of the drawings, wherein it will be observed that the blade, and all other implements to be associated with the shaft 24, is provided with a central opening 40 to fit over the threaded end of shaft 26, and spaced openings 41 to receive the screws 28 to secure the attachment to the base plate 27. Fig. 1 of the drawings shows the cultivator or rake attachment associated with a cutter having stepped and spaced cutting blades indicated at 42 attached to the base plate 27 in similar manner, while Fig. 3 illustrates still a different cutter 43 associated with the cultivator or rake 39, which cutter is shown in detail in Fig. 5 of the drawings.

The cultivator member comprises a plurality of arms formed preferably of more or less flexible yet tough material such as woven wire or cable, properly banded near their outer ends as at 44 to prevent fraying. These cable members are attached to a central hub 45 having a base flange 46 provided with properly spaced openings through which the screws 28 may pass to secure the said flange to the base plate 27 carried by the shaft 24. The yoke has rigidly secured thereto near its outer end an arcuate hood 47 which overlies the rotating cutting, cultivating or agitating members to prevent dirt and other material dug from the ground being thrown beyond the mower.

The yoke is also provided with a guide capable of being readily operated to follow the edge of a walk or curb and to properly position the cutting or agitating device with respect thereto. This guide comprises an elongated flat plate 48 pivoted inwardly from its ends as at 49 to a suitable bracket 50 depending from the housing 23 of the shaft 24. The guide 48 is held in frictional engagement with the bracket arm 50 by spring 51 so as to maintain the guide in either operative or inoperative positions. It will be understood that when the guide 48 is to be utilized, its upper end 48a is moved in a rearward direction causing the opposite end to be extended downwardly, while when moved in the reverse direction the guide 48 will be lifted from the ground so as to be clear thereof. In the operation of the machine, the mower will be so manipulated that the guide 48 will travel along and frictionally engage the sidewalk or curb edge, thus properly positioning the cutting implements with respect thereto. The guide 48 thus not only serves to properly locate the cutting implements, but also prevents the latter from coming in contact with the curb to avoid damage to the cutting implements as well as to the sidewalk edge.

From the foregoing it is obvious that I have provided an attachment which is capable of being easily and quickly applied to a standard mowing machine and is of such construction that it may be readily manipulated by simple operations and without the necessity of special skill or knowledge. Moreover, the only change involved in the mowing machine itself is the removal of the standard starter head and the substitution therefor of the cone head 29 here illustrated. The securing plate 21 is easily attached to the mower frame and constitutes a rigid support for the attachment. With the attachment applied in the manner heretofore detailed, it is obvious that such attachments as are required for a desired result, either singly or in combination with others, may be readily applied. They may equally as readily be interchanged or arranged in other relationships. With the desired implements attached to the shaft 24, with the frame raised to inoperative position and the power belt slackened, the engine may be started by winding the starter rope upon the cone head 29 in the usual manner. After the motor has been started, the lever 35 may be moved to the forward or operative position, automatically tightening the belt 30 and thus establishing the drive connection. It will be understood that in operating the device, the traction wheels and supporting roller of the mower will rest upon the sidewalk, with the lever 35 so positioned as to elevate the frame 15. When the mower has been so positioned as to bring the guard 48 in alignment with the side edge of the walk, the lever will be thrown forwardly to operative position, lowering the frame so that the cutting elements will be brought in contact with the ground and the power connection between the motor shaft 13 and the attachment shaft 24 will be established. As heretofore stated, the machine may be operated with or without the guide 48. Should it be desired to remove the attachment, it is but necessary to rotate the shaft 17 by pulling upwardly upon the arm 31 until the latch 32 is disengaged from the adjacent yoke arm 16, whereupon the pivot pin 17 may be withdrawn from the aligned openings of the yoke arms with those of the bracket 18. The forward end 33a of the elongated link 33 may be readily detached from the pin 34. In those instances where the lawn mower is to be used without operation of the edging apparatus, the operating lever 35 may be retracted to the position shown in Figs. 1 and 4, whereupon the yoke and the mechanism carried thereby will be locked in raised or inoperative position with the power connection automatically broken by slackening of the power belt 30.

The implements here illustrated and described are designed for specific edging, cultivating, raking or agitating uses, but it will be understood that I am not limited to the use only of those attachments here illustrated as it is obvious that a variety of differently shaped and constructed cutting, agitating or edging devices may equally as effectively be employed, depending upon the results to be accomplished.

I claim:

An attachment for mowers having a frame and a motor mounted thereon in which the power shaft extends in a substantially horizontal direction; said attachment comprising a bracket connected to the frame of said mower and projecting upwardly therefrom, a yoke including a pair of arms pivotally connected at their rear ends to the lower end of said bracket and projecting forwardly therefrom, a tool shaft rotatably mounted in the forward ends of said arms in substantial parallelism with the power shaft of said motor, a cutting tool detachably secured to one end of said tool shaft, a pulley secured to the opposite end of said tool shaft, a pulley secured to the power shaft of said motor, a belt connecting said pulleys, a lever pivoted at its lower end to the upper end of said bracket, a link pivoted at its inner end to said lever inwardly of the ends of the latter and extending forwardly and downwardly with respect to said mower, and the outer end of said link pivotally connected to said yoke adjacent to the forward end of the latter and below the plane of said lever pivot.

References Cited in the file of this patent

UNITED STATES PATENTS

| | | |
|---|---|---|
| 2,517,405 | Moss | Aug. 1, 1950 |
| 2,521,033 | Bell | Sept. 5, 1950 |
| 2,618,919 | Hutchens | Nov. 25, 1952 |
| 2,663,137 | Asbury | Dec. 22, 1953 |
| 2,676,447 | Asbury | Apr. 27, 1954 |